Dec. 11, 1928. E. E. CLEMENT Re. 17,163
RADIO BROADCAST SELECTING AND DISTRIBUTING SYSTEM
Original Filed Feb. 29, 1924
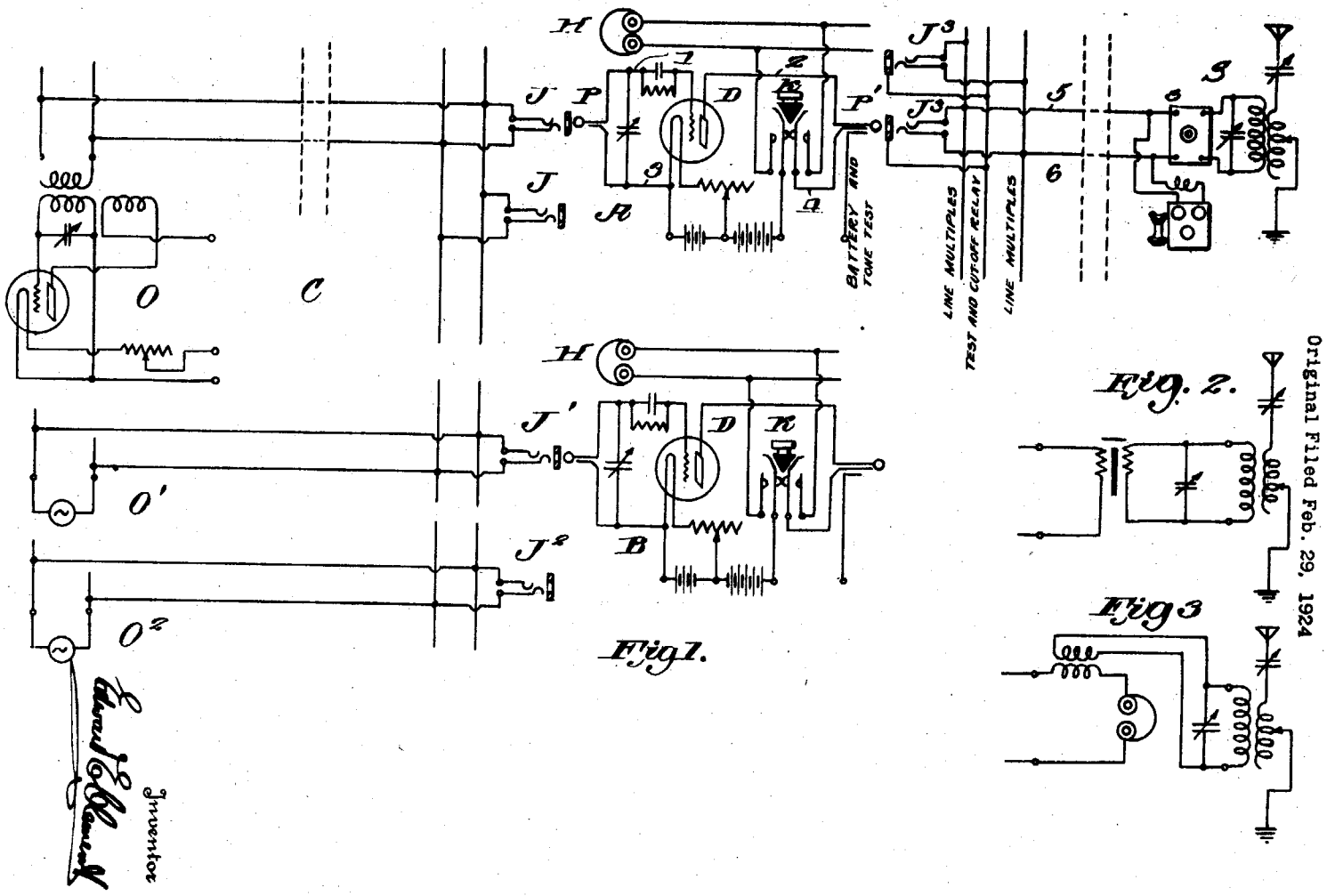
Inventor
Edward E. Clement Reissued Dec. 11, 1928.

Re. 17,163

UNITED STATES PATENT OFFICE.

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA.

RADIO BROADCAST SELECTING AND DISTRIBUTING SYSTEM.

Original No. 1,522,360, dated January 6, 1925, Serial No. 695,993, filed February 29, 1924. Application for reissue filed January 5, 1927. Serial No. 159,248.

My invention relates to systems for radio broadcast distribution and has for its object to render it possible for subscribers with a very simple type of receiving apparatus to be able to select with certainty and receive with ample power from any distant station within the range of the present high powered long range receivers, such as the superheterodyne.

It is an object of my invention to provide additional receiving apparatus at the central station adapted to cooperate with the simple receiving apparatus at the subscriber's station for the detection of the signal modulations and at the same time to supply to the line circuits a type of current which will prove suitable for communication back and forth between the subscribers and the operator. Other objects will sufficiently appear hereinafter.

I attain my object by providing each subscriber to the system with a receiving antenna and tuned secondary circuit as usual, and I supply each subscriber from a central station with unmodulated pulsating current at a frequency suitable to heterodyne with the carrier current received from any particular or desired distant station. In order to be able to do this, I install at a central station a plurality of oscillators tuned to different frequencies, and I provide the output terminals of these oscillator circuits with proper switching terminals, such as jacks or the like, so that they can be interconnected with the subscriber's wired lines. In the connecting circuits, which may be ordinary cord circuits with terminal plugs, provided at the central office for connecting oscillators to the subscriber's lines, I provide detector tubes, which rectify the oscillator currents, and since their plate circuits are connected to the lines, they supply the latter with unmodulated pulsating high frequency heterodyning currents. These currents are taken in at the subscriber's station in one side of either a differential circuit or in a differential receiver and therein combined with the modulated radio currents received over the antenna circuit.

In one form of the invention, the currents thus supplied from central are combined with the received modulated radio waves to produce locally an amplified modulated asymmetric beat wave, which is capable of being received on an ordinary radio telephone receiver. However, various types of local heterodyning circuits or instruments may be employed, the invention residing particularly in the supply and transmission from the central station of unmodulated oscillator current at different frequencies, to enable the subscriber to make selection by heterodyning without the trouble of elaborate apparatus or tuning at his substation. An ancillary but very important feature of the invention is the furnishing of unmodulated pulsating current for heterodyning whereby the beat wave will be an asymmetric modulated wave, capable of being received in a simple receiver set or in an ordinary radio telephone receiver, when properly connected, without further detection, thus obviating the necessity for a plurality of detectors at the subscriber's stations. Furthermore, the type of current thus supplied in the line circuits is suitable for communication back and forth between the subscribers and the operators.

My invention is illustrated in the accompanying drawings in which—

Fig. 1 is a schematic diagram showing a central station and a subscriber's station and connecting circuits for the same, together with oscillators at the central station.

Figs. 2 and 3 show special forms of subscribers' receivers.

Referring to the drawing, Fig. 1, C is a central station and S is a subscriber's station. At the former I locate oscillators O, O′, $O^2$, etc., having their circuits connected to switching terminals J, J′, $J^2$, etc., whereby they may be interconnected with the switching terminals $J^3$ of subscriber's lines. The switching terminals in the drawings are shown as jacks, and the connecting means as plug cord circuits A and B. The cord A has a plug P and a plug P′ connected by conductors 1, 2, 3, 4, 1 and 3 constituting the input or grid circuit of a tube detector D, the plate or output circuit of which is connected through the plug P′ to line wires 5—6 leading to the subscriber's station.

The subscriber's receiving apparatus is represented diagrammatically at *s*, and may take the form of any of the usual types of apparatus, even the simplest type of crystal detector set, or it may take either of the special forms shown in Figures 2 and 3. Figure 2 represents a type of Fessenden receiver, in which one coil is connected to line, and the other is coupled to the receiving antenna, one of the coils being preferably associated in fixed relation with the diaphragm in the well known manner. In Figure 3 is shown an equivalent arrangement of coils in which the received waves and those supplied from central are both supplied in the plate circuit of the detector tube extended, instead of being confined in separate circuits as in the Fessenden type receiver shown in Fig. 2. It is apparent that, in either case, with proper selection of oscillator frequency at the central station, the signal is made audible in the subscriber's radio receiver without the need for providing a separate detector at the subscriber's station.

It is to be understood that it is within the spirit of my invention to make the receiving apparatus *s* at the subscriber's station of any desired type, there being no need to limit it to the simple types of receiving apparatus herein mentioned. It is, however, an important feature of my invention that the results attainable with a simple receiver apparatus connected according to my invention, are on a par with those usually attainable only with a high powered long range receiver such as the superheterodyne.

The service rendered by the central station C to its subscribers includes a certain range in point of distance, and also a certain range in point of wave lengths through which selections can be made under the supervision of the operators. For example, from 200 to 600 meters is the usual range of short wave lengths used in ordinary telephone broadcasting. The wave lengths supplied by the oscillators O, O′, $O^2$ should be such that they will form a heterodyning scale with the broadcasting wave lengths of the stations listed and intended to be received by the subscriber. Each subscriber will have to do his own tuning as at present, so far as his antenna circuit and local receiving circuit is concerned, but this is simple when the instrument is calibrated and standardized, involving merely the setting of the variable condensers or equivalent apparatus to readings taken from a table. Beyond this the subscriber has nothing to do except to ask central for the station wanted. He is thereupon supplied with unmodulated oscillator current of such a frequency that the difference between it and the frequency of the waves used by the station wanted, will be the uniform beat frequency to which all the subscriber's instruments are standardized.

The operator is provided in each cord circuit with a key K by means of which she can include her headset H in the plate circuit and therefore in series with the line and the subscriber's instrument. It is possible to make this a bridging arrangement by using a bridging battery in the plate circuit, with radio and audio choke coils in the battery bridge. The plate-filament branch of the tube, the subscriber's circuit, and any temporary connection of the operator's set would then all be in parallel with the battery, and the subscriber and the operator can talk back and forth over the circuit of the high frequency high potential pulsating plate current. The same is true of the series arrangement.

I claim:

1. In a system of radio broadcast distribution, a central station and subscribers' stations and wired line circuits interconnecting them, means at a subscriber's station for receiving modulated radio frequency carrier waves, means at the central station for supplying the subscriber's station over said wired line with unmodulated periodic current at such a frequency as will heterodyne with the modulated waves received at the subscriber's station, to produce a standard modulated beat wave in the subscriber's receiver.

2. In a system of radio broadcast distribution, a central station and subscribers' stations and wired line circuits interconnecting them, means at the subscriber's station for receiving ether waves, means at the central station for generating unmodulated periodic current, switching means for connecting said central office generators interchangeably with said subscriber's wired line circuits, and audio receivers at the subscriber's station responsive to modulations carried on the standard beat waves due to the composition of the modulated and the unmodulated waves received through the ether and through the line circuits respectively.

3. In a system of radio broadcast distribution, a central station and subscribers' stations and wired line circuits interconnecting them, an oscillator circuit at the central office, switching terminals therefor, switching terminals for the line circuits, and intermediate connecting circuits with terminals adapted to operate interchangeably with said switching terminals, each connecting circuit including a detector whereby the oscillator current is rectified and transmitted over the subscriber's line as a high frequency unmodulated high potential pulsating current, adapted to combine with received radio carrier waves to produce an asymmetric modulated beat wave.

4. In a system of broadcast distribution, a central station, a subscriber's station, and a line circuit interconnecting them, a broadcast wave absorbing device at the subscriber's station, a receiving and demodulating apparatus for broadcast waves comprising a vacuum tube detector located at the central station with its plate circuit extended over said line circuit to the subscriber's station, and means for establishing telephone communication between the central station and the subscriber's station by the utilization of the energy of said plate circuit.

5. A combined radio broadcast and telephone system comprising a telephone central station, a plurality of subscribers' stations and wired line circuits interconnecting them, a high frequency wave receiving device at each subscriber's station, a demodulating circuit for said high frequency waves comprising a vacuum tube at the central station, means to complete the plate circuit of said tube over any one of said line circuits, and means for establishing telephone communication from the central station to the connected subscriber's station over the plate circuit of said vacuum tube.

6. In a system of radio broadcast distribution, a central station, and a subscriber's station and a wired line circuit interconnecting them, an oscillator circuit at the central station, an intermediate connecting circuit and switching means for coupling said oscillator circuit to the line circuit through said intermediate connecting circuit, said connecting circuit including a detector whereby the oscillator current is rectified and transmitted over the subscriber's line as a high frequency unmodulated high potential pulsating direct current for use in demodulating received radio broadcast waves, and means for establishing telephonic communication between the central station and the subscriber's station over the high potential direct current circuit.

7. In a system of radio broadcast distribution, a central station, a plurality of subscribers' stations, and wired line circuits interconnecting them, means at each subscriber's station for receiving broadcast waves and for transmitting them to the line circuits, an oscillator circuit at the central station adapted to supply waves for combination with the received radio broadcast waves, a plurality of intermediate connecting circuits at the central station each comprising an asymmetrically conducting vacuum tube, and switching means for connecting the oscillator in common to a plurality of subscriber's lines through individual connecting circuits, so as to extend the plate circuit of each vacuum tube over its connected line circuit, whereby interference between subscribers' line circuits is prevented.

8. In a system of broadcast distribution, a receiving station, a broadcast wave absorbing device at said station, and a receiving and demodulating apparatus for broadcast waves comprising a source of oscillations and a vacuum tube detector responsive thereto and having its plate circuit connected to said receiving station to supply high frequency unmodulated high potential pulsating direct current thereto, and means to combine said current with the waves absorbed at the receiving station to produce audible waves in a suitable receiver, said receiving and demodulating apparatus being separated, whereby a centralized distribution system is maintained.

9. In a system of broadcast distribution, a receiving station, a broadcast wave absorbing device at said station, and a receiving and demodulating apparatus for broadcast waves comprising means for supplying said station with unmodulated high potential pulsating direct current at a frequency of the same order as that of the broadcast waves and means at said station for combining said currents with the absorbed energy of said modulated broadcast waves to produce audible effects in a telephone receiver, said receiving and demodulating apparatus being separated, whereby a centralized distribution system is maintained.

10. In a system of broadcast distribution the method of receiving signals modulated on carrier waves of superaudio frequency which consists in absorbing the energy of said waves, producing at a distant point other energy in the form of unmodulated asymmetric pulsating current at a frequency of the same order as that of the absorbed waves, transmitting said produced energy, combining said produced energy with said absorbed waves and causing the resultant current wave to produce sound waves corresponding to the original signal modulations.

In testimony whereof I hereunto affix my signature.

EDWARD E. CLEMENT.